US009278414B2

(12) United States Patent
Haimer

(10) Patent No.: US 9,278,414 B2
(45) Date of Patent: Mar. 8, 2016

(54) INDUCTION COIL ASSEMBLY

(75) Inventor: Franz Haimer, Igenhausen (DE)

(73) Assignee: FRANZ HAIMER MASCHINENBAU KG, Igenhausen (DE)

( * ) Notice: Subject to any disclaimer, the term of this patent is extended or adjusted under 35 U.S.C. 154(b) by 1656 days.

(21) Appl. No.: 11/910,148

(22) PCT Filed: Apr. 3, 2006

(86) PCT No.: PCT/EP2006/003020
§ 371 (c)(1),
(2), (4) Date: Jun. 2, 2008

(87) PCT Pub. No.: WO2006/103105
PCT Pub. Date: Oct. 5, 2006

(65) Prior Publication Data
US 2008/0277386 A1    Nov. 13, 2008

(30) Foreign Application Priority Data
Apr. 1, 2005   (DE) .......................... 10 2005 014 984

(51) Int. Cl.
| H05B 6/14 | (2006.01) |
| H05B 6/38 | (2006.01) |
| B23P 11/02 | (2006.01) |

(52) U.S. Cl.
CPC ................ *B23P 11/027* (2013.01); *H05B 6/14* (2013.01); *H05B 6/38* (2013.01)

(58) Field of Classification Search
CPC ........ B23P 19/00; B23P 11/02; B23P 11/027; B23P 19/02; B23P 19/04; B23C 5/26; B23Q 3/12; B23Q 1/70; B23Q 11/1023; B23Q 1/0009; H05B 6/14; H05B 6/38
USPC ......... 219/644, 200, 201, 227, 607, 632, 635, 219/637, 639, 640, 652, 667, 677; 158/89, 158/85; 409/234, 232, 231; 29/447
See application file for complete search history.

(56) References Cited

U.S. PATENT DOCUMENTS 3,935,416 A * 1/1976 Cachat .......................... 219/639
4,573,380 A * 3/1986 Bald .............................. 82/142
(Continued)

FOREIGN PATENT DOCUMENTS

| DE | 2008675 | 9/1971 |
| DE | 10157432 | 6/2003 |

(Continued)

OTHER PUBLICATIONS

International Search Report dated Jun. 29, 2006 issued by the European Patent Office; PCT/EP2006/003020; Applicant, Franz Haimer Maschinenbau KG et al.
(Continued)

*Primary Examiner* — Eric Stapleton
(74) *Attorney, Agent, or Firm* — Sheridan Ross P.C.

(57) ABSTRACT

The induction coil unit for heating a sleeve section of a tool holder holding the shaft of a rotation tool in a receiver opening in press fit comprises two coil units, whose distance can be changed selectively through at least one slanted surface cam assembly. A magnetic flux concentrator assembly with several concentrator elements distributed in circumferential direction is associated with the coil unit adjacent to the free end of the sleeve section. The width of a pass through opening defined by the concentrator elements for the tool shaft is also changeable through a control cam, to which the concentrator elements are coupled through a slanted surface cam assembly. The two slanted surface cam assemblies are coupled amongst each other in a useful manner in order to simplify the operation of the unit.

24 Claims, 7 Drawing Sheets

(56) References Cited

U.S. PATENT DOCUMENTS

| | | | |
|---|---|---|---|
| 5,041,806 A * | 8/1991 | Enderle et al. | 335/295 |
| 5,140,739 A * | 8/1992 | Yamaguchi et al. | 483/18 |
| 5,193,954 A * | 3/1993 | Hunt | 409/233 |
| 5,280,671 A * | 1/1994 | Marquart | 29/447 |
| 5,391,862 A * | 2/1995 | Amateau et al. | 219/667 |
| 5,710,412 A * | 1/1998 | Hansen | 219/633 |
| 6,048,144 A * | 4/2000 | Bohler et al. | 409/231 |
| 6,111,236 A * | 8/2000 | Storm et al. | 219/639 |
| 6,216,335 B1 | 4/2001 | Freyermuth | |
| 6,260,858 B1 * | 7/2001 | DeLucia | 279/102 |
| 6,362,462 B1 * | 3/2002 | Merrell et al. | 219/672 |
| 6,680,466 B2 * | 1/2004 | Rabe | 219/635 |
| 6,755,228 B2 * | 6/2004 | Kelch | 156/499 |
| 6,818,871 B2 * | 11/2004 | Ogasawara et al. | 219/619 |
| 6,822,206 B2 * | 11/2004 | Haimer | 219/635 |
| 6,857,177 B2 * | 2/2005 | Taylor | 29/447 |
| 6,861,625 B1 * | 3/2005 | Haimer et al. | 219/607 |
| 6,991,411 B2 * | 1/2006 | Irion et al. | 409/234 |
| 7,060,951 B2 | 6/2006 | Haimer et al. | |
| 7,062,847 B2 * | 6/2006 | Haimer | 29/800 |
| 7,220,942 B2 * | 5/2007 | Barton et al. | 219/137.2 |
| 7,318,346 B2 * | 1/2008 | Haimer | 73/462 |
| 7,491,023 B2 | 2/2009 | Oesterle | |
| 2001/0024020 A1 * | 9/2001 | Rabe | 279/158 |
| 2001/0054471 A1 * | 12/2001 | Kelch | 156/85 |
| 2003/0088972 A1 * | 5/2003 | Haimer | 29/700 |
| 2003/0132582 A1 * | 7/2003 | Haimer | 279/102 |
| 2003/0168445 A1 * | 9/2003 | Haimer | 219/643 |
| 2003/0209535 A1 * | 11/2003 | Haimer et al. | 219/600 |
| 2005/0016995 A1 * | 1/2005 | Mitamura et al. | 219/635 |
| 2005/0205554 A1 * | 9/2005 | Haimer et al. | 219/607 |
| 2005/0236401 A1 * | 10/2005 | Davids et al. | 219/635 |
| 2006/0048368 A1 * | 3/2006 | Pfau | 29/447 |
| 2006/0070984 A1 * | 4/2006 | Barton et al. | 219/137.7 |
| 2006/0163245 A1 * | 7/2006 | Pfau | 219/635 |
| 2010/0200571 A1 | 8/2010 | Haimer | |

FOREIGN PATENT DOCUMENTS

| | | |
|---|---|---|
| DE | 102005005892 | 8/2006 |
| EP | 1519632 | 3/2005 |
| WO | WO 0189758 | 11/2001 |
| WO | WO 2006/084678 | 8/2006 |

OTHER PUBLICATIONS

International Search Report prepared by the European Patent Office on Sep. 3, 2008, for International Application No. PCT/EP2008/001096, 6 pages.

International Preliminary Report on Patentability with English translation prepared by the European Patent Office on Aug. 19, 2009, for International Application No. PCT/EP2008/001096, 11 pages.

Notice of Allowance for U.S. Appl. No. 12/528,221, mailed Sep. 20, 2012, 7 pages.

Official Action for U.S. Appl. No. 12/528,221, mailed Jun. 13, 2012 5 pages.

* cited by examiner

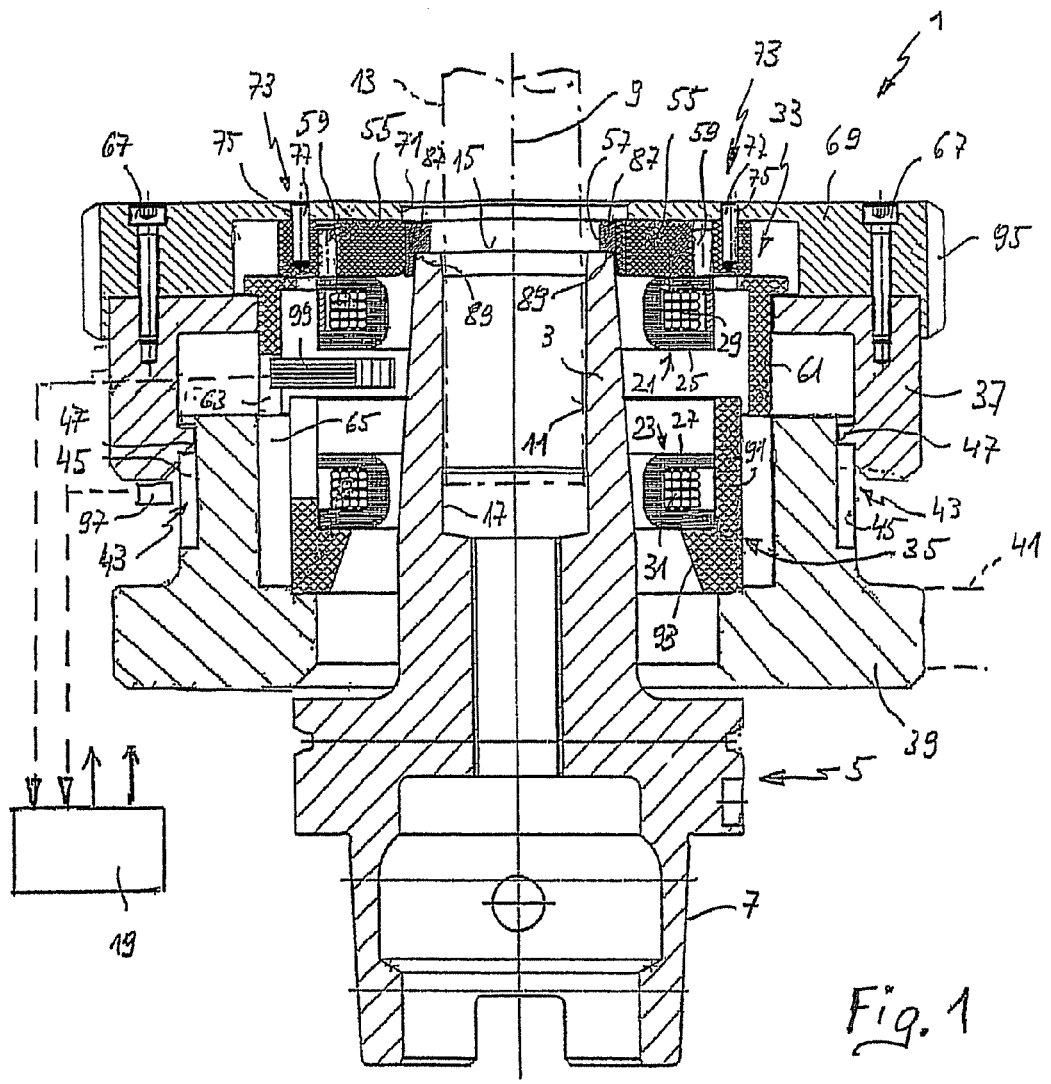
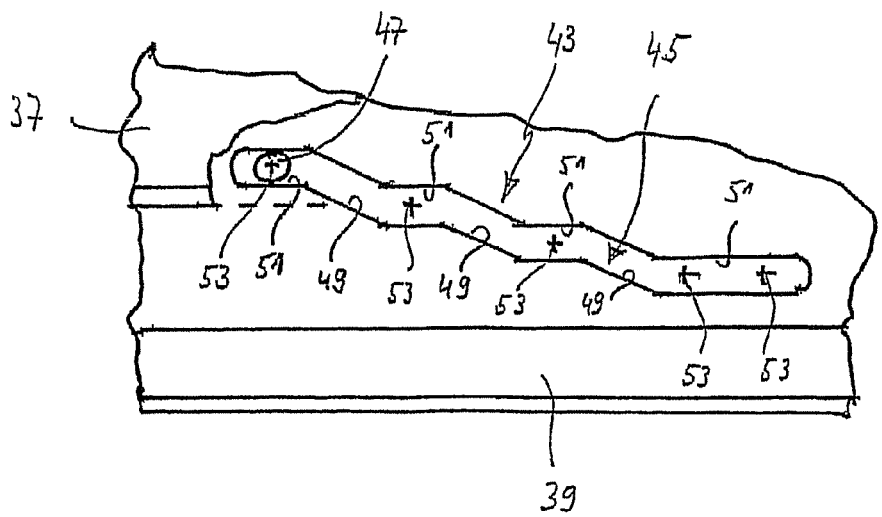
Fig. 1
Fig. 4

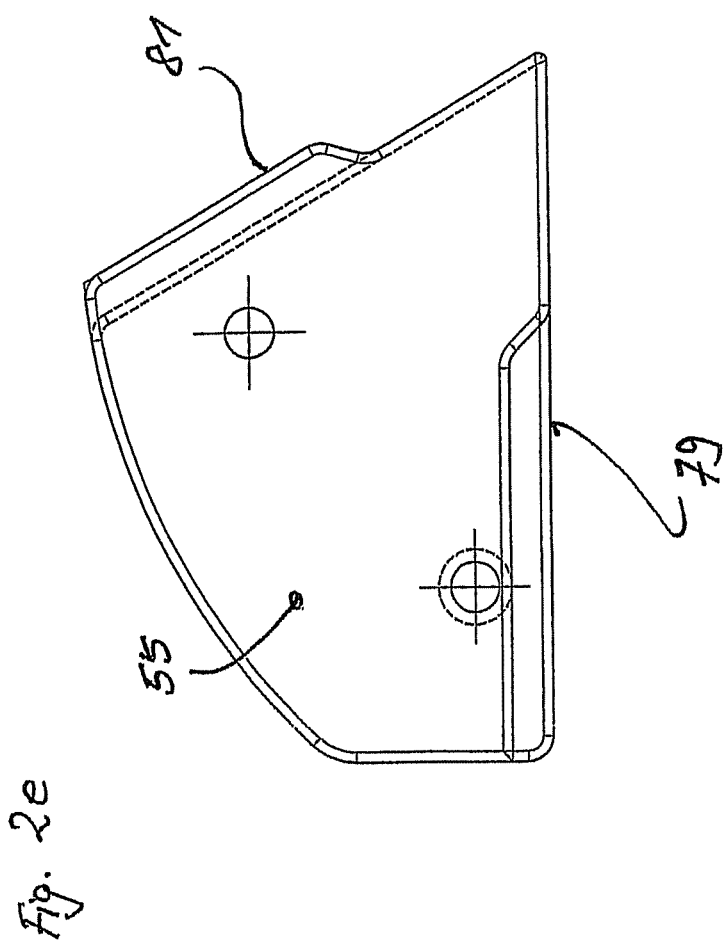

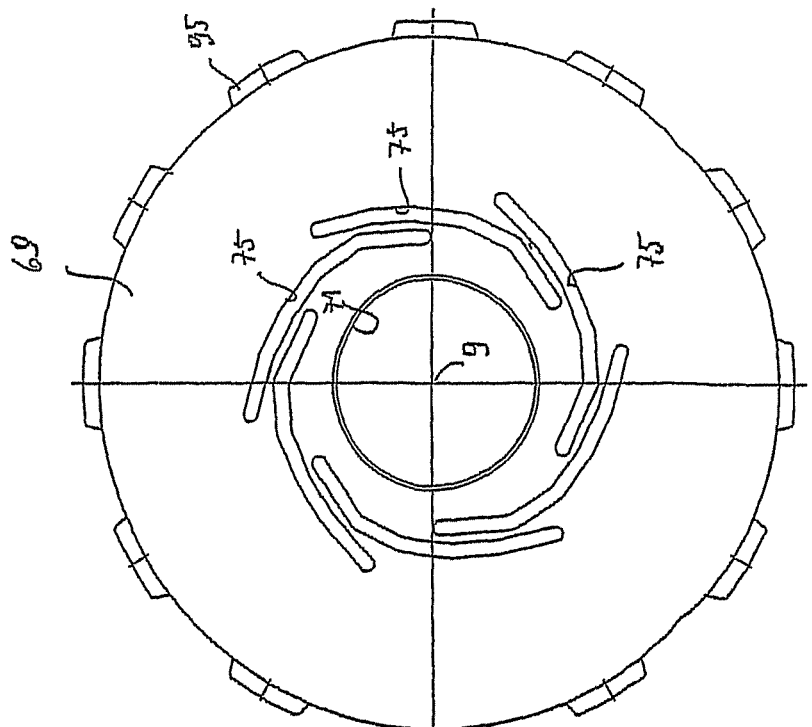
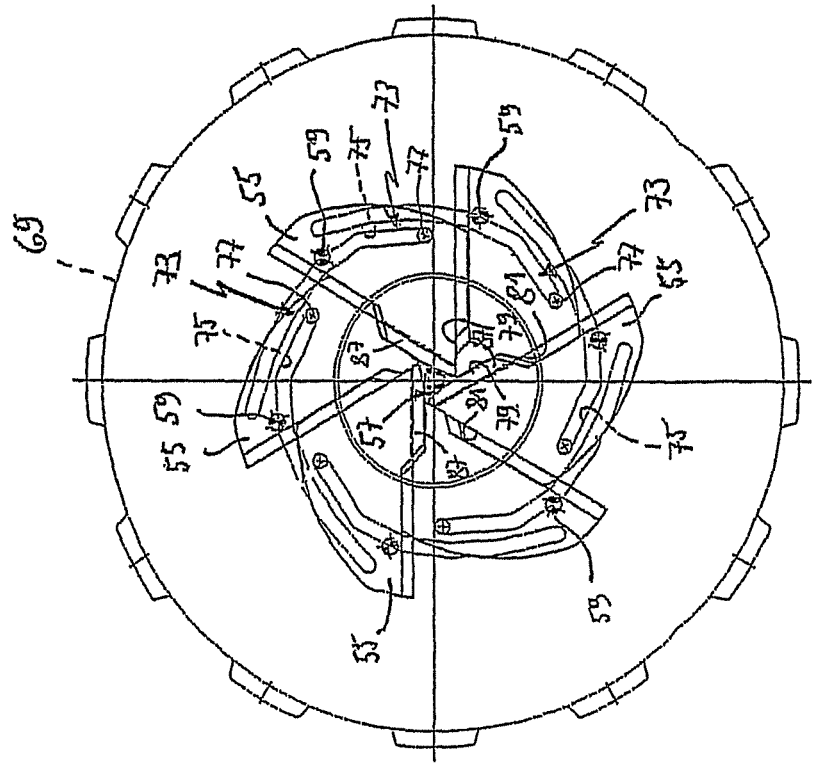
Fig. 3a
Fig. 3b

INDUCTION COIL ASSEMBLY

CROSS REFERENCE TO RELATED APPLICATION

This application is a national stage application under 35 U.S.C. 371 of PCT Application No. PCT/EP2006/003020 having an international filing date of Apr. 3, 2006, which designated the United States, which PCT application claimed the benefit of Germany Application Serial No. 10 2005 014 984.7, filed Apr. 1, 2005, the entire disclosure of each of which is hereby incorporated herein by reference.

FIELD OF THE INVENTION

The invention relates to an induction coil unit for heating a free ending sleeve section of a tool holder having a central receiver opening for a shaft of a rotating tool, wherein said tool holder holds the shaft of the tool located in the receiver opening coaxial to the rotation axis of the tool holder in a press fit, releasing it upon heating.

BACKGROUND OF THE INVENTION

From WO 01/89758 A1 it is known to heat the sleeve section inductively through an annular coil assembly, substantially enclosing the sleeve section in a coaxial manner. The coil assembly is connected to a high frequency AC generator and induces Eddy currents in the metal sleeve section, heating said sleeve section. At the face sides, and on the circumference of the coil assembly concentrator elements, made from magnetically soft, substantially electrically non conductive material like ferrite or similar are disposed, which direct the magnetic flux generated by the coil assembly onto the sleeve section of the tool holder, and in particular into the portion of the free end of the sleeve section. The portions adjacent to the free end of the sleeve section of the concentrator arrangement are formed by radially moveable elements. The pass through enclosed by said elements can be adapted to the diameter of the tool holder in this manner. Said elements are supported on the axial face area of the free face end of the sleeve section during operation and thus determine the axial position of the coil assembly and of the concentrator assembly, otherwise connected with it into a unit, relative to the free end of the sleeve section during heating operation. This way the induction coil unit can be positioned axially relative to the tool holder.

From DE 101 57 432 A1 a similar induction coil unit is known, in which however the annular coil assembly enclosing the sleeve section during heating operation includes two coil sections, disposed at a fixed axial distance from each other. The axial portion between the two coil portions has no coils. This way it is accomplished that the sleeve section heats up less in its middle section, than in its end section.

The sleeve section of the tool holder has an axial length adapted to its use and the diameter of the sleeve section is selected according to the diameter of the tool shaft. In conventional induction coil units only the diameter of the pass through opening for the tool shaft, which is determined by the magnetic flux concentrator assembly can be adapted to the tool holder to be heated. Since the coil assembly has a predetermined constant axial length, either the coil assembly has to be replaced, or it can not be avoided that a portion of the tool holder which is not used for clamping the shaft of the tool, is also being heated.

SUMMARY OF THE INVENTION

It is an object of the invention to provide an induction coil unit through which tool holders can be heated homogenously in spite of different axial lengths of the portion of the sleeve section that needs to be heated.

The invention is based on an induction coil unit comprising:
- an annular coil assembly surrounding the sleeve section substantially concentric during heating operation;
- a magnetic flux concentrator assembly, made from magnetically soft, electrically substantially non conductive material, reaching at least close to the free end of the sleeve section of the tool holder, on the side of the coil assembly adjacent to the free end of the sleeve section.
- Stop means operating together with the tool holder, determining the axial position of the coil assembly and of the concentrator assembly, relative to the free end of the sleeve section during heating operation.

The above object is accomplished according to the invention by a coil assembly having two concentric coil units, which however are disposed at a distance which can be operatively changed, and/or through a second magnetic flux concentrator assembly from magnetically soft, substantially electrically non conductive material, disposed on the side of the coil assembly, remote from the free end of the sleeve section whose axial distance from said concentrator assembly can be changed operatively, and adjustment means are provided, allowing a selective adjustment of the axial position of the two coil units and/or of the two concentrator assemblies relative to each other, and a selective adjustment of the axial position of at least one of the two coil units and/or at least one of the two concentrator assemblies relative to the stop means.

The portion, in which the magnetic flux generated by the coil assembly generates Eddy currents in the sleeve section, warming the sleeve section, can be selected in a defined manner and positioned with respect to the free end of the sleeve section through this measure. The induction coil unit can thus be adapted to the tool holder through a clamping portion of the sleeve section of variable length in a defined manner.

The two coil units or concentrator assemblies can be locked relative to each other, or possibly relative to a housing, or a holder of the induction coil unit, so that the axial distance of the coil units or the concentrator assemblies cannot change due to the magnetic forces. Herein it can be provided that the axial position of both coils units and/or of both concentrator assemblies can be changed relative to the stop means and locked. In a preferred embodiment it is provided however that one of the two coil units and/or one of the two concentrator assemblies has a fixed axial position relative to the stop means and that the axial position of the other two coil units, or of the other of the two concentrator assemblies can be adjusted relative to the stop means in a defined manner through the adjustment means. This simplifies the design of the induction coil unit and also simplifies its handling during operations, since the coil unit or concentrator assembly, which are connected to the stop means in an axially fixated manner, can be disposed at a constant axial position relative to the free end of the sleeve section of the tool holder, which has proven advantageous for an even heating of the sleeve section. Preferably the adjustment means are provided, so that they define predetermined axial positions relative to the stop means. Such indexing facilitates the handling.

The two coil units or the two concentrator assemblies can be guided, so that they can be moved in an axial manner relative to each other. In order to able to also adjust rather small distance differences in a simple and reproducible manner, the drive motion is performed through a reduction gear unit in a useful manner, transposing a relatively large travel of a handling organ, which can be operated e.g. manually, into a comparatively small axial positioning stroke of the two coil units, or the two concentrator assemblies relative to each other. In a particularly simple embodiment it is provided that the two coil units and/or the two concentrator assemblies are guided relative to each other so they are moveable in an axial manner and supported in an axial manner relative to each other through at least one helix shaped control surface extending around the rotation axis. The outer circumference of the coil units or concentrator assemblies is rather large, so that a sufficiently large reduction of the motion of the outer circumference relative to the axial stroke is achieved. The control surface is limited on both sides in axial direction, e.g. it is provided as a helical slot, so that the control surface is effective axially in both directions. Preferably several such control surfaces are provided distributed in circumferential direction in order to make radial forces symmetrical, which would otherwise cause wedging. It is appreciated that the control motion can also be driven by a servo motor, should this be required.

As described above, axial forces can occur between the two coil units or concentrator assemblies, due to the magnetic flux during operation, wherein said forces have to be received by an arresting device. This can be accomplished very easily with the at least one control surface having control surface sections in predetermined axial positions of the two coil units, or the two concentrator assemblies, wherein said control surface sections extend in orthogonal planes relative to each other, holding the coil units or the concentrator assemblies in position axially. The orthogonal control surface sections operate in a self locking manner.

Each coil unit is preferably connected in an axially fixated manner with the concentrator assembly, located on its particular side. The concentrator assemblies are hereby preferably provided, so that they shield the magnetic field of the coil assembly to the outside extensively. As least one of the two concentrator assemblies therefore comprises a portion protruding axially relative to the other concentrator assembly, radially outside of the coil assembly, wherein said protruding portion overlaps axially with the other concentrator assembly substantially in the entire portion of the axially changeable positions. In a useful manner the two concentrator assemblies have sleeve sections, protruding towards each other and interlocking with each other in a coaxially telescoping manner. It is appreciated that the interlocking portions can also be realized through interlocking finger structures.

At least the first concentrator assembly, axially adjacent to the free end of the sleeve section of the tool holder, preferably also the second concentrator assembly can have several concentrator elements moveable relative to each other, made from magnetically soft, electrically substantially non conductive materials, disposed in circumferential direction around the rotation axis, radially distributed along the interior circumference of the induction coil assembly protruding toward the inside, whose radial overhang towards the rotation axis beyond the interior circumference of the induction coil assembly can be operatively changed relative to the concentrator assembly. In such an induction coil unit not only the axial effective length of the Eddy current heating can be adjusted, but also the magnetic flux can be focused onto the free end of the sleeve section. Suitable designs of the concentrator elements are described in WO 01/89758 A1. Concentrator elements have proven to be particularly suited, which are pivotable relative to the induction coil assembly around pivot axes extending parallel to the rotation axis, since pivot guides are less prone to wedging than linear guides. Concentrator elements are particularly suited, which have approximately disc shape, which are located opposite to the rotation axis, forming a pass through opening for the sleeve section of the tool holder, and which extend with a second rim extending at a slanted angle to the first rim along the first rim of a concentrator element adjacent in circumferential direction. This way, no gaps, or very narrow gaps remain in circumferential direction between adjacent concentrator elements, even when the concentrator elements do not overlap, and the pivot motion of the concentrator elements around their pivot axes can be controlled rather smoothly.

In a preferred embodiment, which also constitutes and invention in its self, and can thus be used also with other induction coil units, than the ones described above, it is provided that the discs of the concentrator elements are substantially aligned orthogonal to their pivot axes, and the first and the second rim of adjacent concentrator elements overlap at least over part of their length in circumferential, overlap in particular in an interlocking manner, and that the concentrator assembly comprises two groups of concentrator elements alternating in circumferential direction, wherein the arrangement is disposed so that the radial overhang of the concentrator elements of the first group beyond the inner circumference of the induction coil assembly at the same angular position is larger than the radial overlap of the concentrator elements of the second group. In this embodiment only the concentrator elements of the first group can placed against the circumference of the sleeve section, while the concentrator elements of the second group are radially offset to the outside with their first rim, without reducing the maximum diameter of the pass through opening defined by the concentrator elements of the first group. This way the maximum diameter can be kept smaller and the sleeve section can also be heated accordingly with a comparatively smaller diameter through the induction coil unit.

The concentrator elements of the first group preferably carry stop elements forming stop means on their first rim for axial positioning of the concentrator assembly, and of the induction coil assembly connected therewith, relative to the tool holder. Also here, the stop means themselves are still effective, when the diameter of the sleeve section is comparably small. However, also separate stop elements can be provided when necessary.

The concentrator elements are also adjustable in a useful manner through a common control element, rotatable coaxial with the induction coil assembly, which is coupled to the concentrator elements through control surface cam follower assemblies.

It has proven advantageous in particular, when the control element is connected torque proof with one of the two coil units, in particular with the coil unit adjacent to the free end of the sleeve section. This way the axial positioning of the two coil units or concentrator assemblies and also the size of the pass through opening for the tool holder can be adjusted with the same control element. Also here, the control element can be operable manually, or it can be driven by a servo motor. However, this coupling is not mandatory, to the contrary the control of the concentrator assembly can also be performed in an isolated manner through the control of the axial positioning of the two coil units, by providing a coupling between the control cam and the guide ring for the axial adjustment of the two coil units, wherein said coupling can e.g. be performed through engagement pins. When laying in the engagement pins the control cam is coupled with the guide ring. When the control pin(s) are laid out the control cam is decoupled from the guide ring for the axial adjustment of the two coil units, and a rotation of the control cam will only lead to an adjustment of the concentrator assemblies.

The coil assembly is fed by an AC generator, preferably providing high frequency power. The current and/or the frequency and/or the voltage and possibly also the time span, in which the coil assembly is excited are predetermined in a known manner through the control of the AC generator and thus depending on the size and type of tool holder in order to avoid damages through overheating at the tool holder. In a preferred embodiment at least one position sensor is associated with the coil unit and/or the concentrator assemblies, generating a signal representing the axial distance of the coil units and/or of the concentrator assemblies and/or the radial distance of at least the first concentrator assembly over the inner circumference of the coil assembly, wherein the AC generator can be controlled depending on this signal. Already the possible manual adjustment of the induction coil unit to the size of the tool holder thus automatically determines the electrical energy to be provided from the AC generator for heating said tool holder. This way operations are simplified.

Alternatively it can also be provided that the axial distance of the coil units and/or of the concentrator assemblies and/or the radial overhang of at least the first concentrator assembly can be adjusted through at least one positioning drive, which is controlled by it depending on the setting of the AC generator. The current set at the AC generator for the tool holder to be heated and/or the power duration and/or the voltage this way also determines the positioning of the coil units, or the concentrator assemblies. Also in this case the operation is simplified. The positioning drive is preferably a stepper motor positioning drive, whose step sequence is a measure for the axial positions of the coil units, or the concentrator assemblies.

It is known to monitor the heating of the tool holder through a temperature sensor. The temperature dependent signal of the temperature sensor can be used for displaying the actual temperature of the sleeve section of the tool holder, or for threshold value dependent generation of a warning signal, or for threshold value dependent shut down of the AC generator. In conventional induction coil units, however the sleeve section is only conditionally accessible for temperature measurement. In a preferred embodiment of the invention it is provided that a temperature sensor is disposed axially between the coil units, detecting the temperature of the sleeve section of the tool holder. In this embodiment space that is available anyhow, is used in a section that is favorable for measuring the temperature of the sleeve section. In particular the temperature sensor can also be brought into direct contact with the surface of the sleeve section, which improves measuring precision.

BRIEF DESCRIPTION OF THE DRAWINGS

Embodiments of the invention are subsequently described in more detail with reference to drawings, showing in:

FIG. 1 an axial longitudinal sectional view of an induction coil unit for heating a tool holder;

FIG. 2b an axial view of a control element of the concentrator assembly in an illustration associated with the position of FIG. 2a;

FIG. 2e another alternative of an embodiment of concentrator elements in top view;

FIG. 3a a top view of the concentrator assembly in minimum open position;

FIG. 3b a top view of the control cam in the position of FIG. 3a;

FIG. 4 a partially cut radial view of an adjustment assembly controlling the distance of coil units of the unit;

DETAILED DESCRIPTION

Figure 2A:
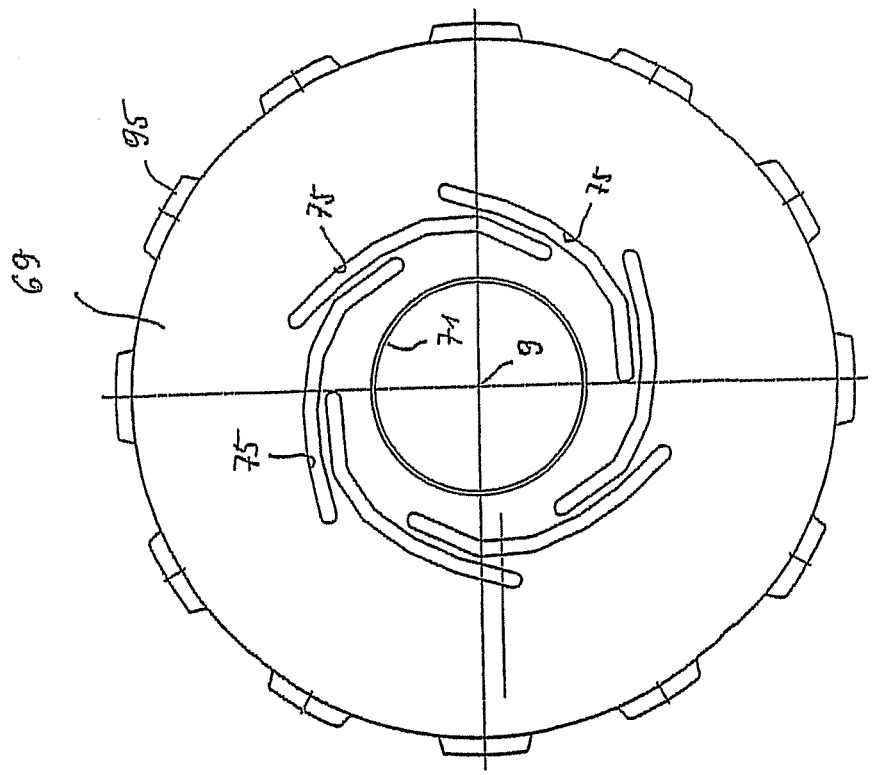
FIG. 2a an axial view of a concentrator assembly of the unit in its maximum open position.

The figures one through four show an induction coil unit 1 for heating sleeve section 3 of a tool holder 5, which can be coupled through a coupling section 7 for rotating operation around its rotation axis 9 to a drive spindle of a machine tool, or similar, which is not illustrated in more detail. The coupling 7 can be a conventional standardized coupling like e.g. a steep cone coupling, or like in the shown embodiment, a hollow shaft coupling.

The sleeve section 3 has a receiver opening (11), concentric to the rotation axis (9), which holds a shaft (13) of a rotating tool, e.g. of a drill or mill bit in a press fit during operation. The press fit clamping section of the receiver opening 11 extends in axial direction only over a part of the axial depth of the receiver opening 11, and thus over a portion, which assures the transfer of a required torque and the axial fixation of the tool shaft 13. Facing away in axial direction from the free end 15 of the sleeve section a diameter expansion 17 follows after the clamping section, wherein said expansion may also be minor in a particular case.

The clamping portion of the sleeve section 3 can be heated by the induction coil unit 1, so that the receiver opening 11 has an oversize relative to the tool shaft 13, thus the tool shaft 13 can be loosely inserted into the receiver opening 11, or removed from it. The induction coil unit 1 is thus connected to an AC generator 19, which supplies AC with a frequency of 10 kHz or more. The magnetic flux generated by the unit 1, which permeates the sleeve section 3 axially, generates Eddy currents in the sleeve section 3, heating the sleeve section 3 and thus expanding it. After cooling down the sleeve section shrinks back to a size, holding the tool shaft 13 in a press fit.

In order to be able to detach the tool shaft 13 form the tool holder 5 it is important that the sleeve section 3 expands in sufficiently short time so far and so homogeneously that the receiver opening 11 has an oversize at all axial positions relative to the tool shaft 13, which may also expand slightly. In order to assure the even heating of the sleeve section 3, the unit 1 has two coil unit 21, 23 disposed in an axial distance from each other, whose coils 29, 31, wound onto coil bodies 25, 27 enclose the sleeve section 3 radially on the outside in an annular manner, and substantially concentric to the rotation axis 9. To each of the coil units 21, 23 a magnetic flux concentrator assembly 33 or 35 is assigned, which is axially fixated with reference to the coil unit 21 or 23.

The coil units 21 and 23, including the associated concentrator assemblies 33 or 35 are connected with one guide ring 37 or 39 each one of which, in this case the guide ring 39 is moveably guided in a guide rail, mounted to the unit, extending in parallel to the rotation axis 9, as indicated at 41, which is not shown in more detail, thus allowing a relative linear displacement of the unit 1 relative to the tool holder 5. The two guide rings 37, 39 are guided at each other, rotatable around the rotation axis 9, and axially moveable along the rotation axis 9, in order to be able to adjust the axial distance of the coil units 21, 23, including the associated concentration assemblies 33, 35, depending on the length of the clamping section of the sleeve section 3 of the tool holder 5, which presently has to be heated.

In radially facing circumferential surface of the guide rings 37, 39 several slanted surface cam assemblies 43 are distributed in circumferential direction, wrapping around the rotation axis in a helical manner, adjusting the axial positions of the two coil units 21, 23 and of the associated concentrator assemblies 33, 35 in both axial directions and a form locked manner through forced guidance in case of a relative rotation between the guide rings 37, 39.

FIG. 4 shows details of the slanted surface cam assemblies 43. Each of the slanted surface cam assemblies 43 comprises a slot 45, generally following a helix line in one of the circumferential surfaces, here the outer circumferential surface of the guide ring 39, into which slot a cam protrusion 47 engages, which protrudes from the other circumference, in this case the inner circumferential surface of the guide ring 37.

The slanted surface cam assemblies 43 are segmented into several slanted surface sections 49 in circumferential direction, which are connected by tangential indexing sections 51, extending in orthogonal planes. Indexing sections 51 also follow at both ends of the slot 45. The slanted surface sections 49 cause a change of the axial distance of the guide rings 37, 39 and thus of the coil units 21, 23, including the associated concentrator assemblies 33, 35 during a relative rotation of the guide rings 37, 39. The indexing sections 51 on the other hand cause an axial interlocking guide rings 37, 39 in certain predetermined axial operating positions, so that axial forces occurring during operation, due to the magnetic field of the coil units 21, 23 cannot adjust the guide rings 37, 39. The operating positions 53 are each assigned to different tool holder dimensions, so that the unit 1 can be adjusted to tool holders with different size through simple rotation of the guide rings 37, 39, relative to each other. If necessary, the guide rings 37, 39 or components connected with these rings carry markings, referring to the tool holder types.

The concentrator assemblies 33, 35 concentrate the magnetic flux of the coil units 21, 23 onto the sleeve section of the tool holder 5. The concentrator assembly 3 adjacent to the free end 15 of the sleeve section 3 formed by a flat front face, which is orthogonal to the axis comprises several concentrator elements 55, shown in top view in the FIGS. 2a and 3a, whose disc surfaces are disposed substantially in planes orthogonal to the axis, and all aligned with each other, defining a pass through opening 57 for the face end 15 or the sleeve section 3. The concentrator elements 55 which are entirely comprised of magnetically soft, substantially electrically non conductive material, e.g. ferrite, are supported at axis pins 59 in parallel to the rotation axis 9 at the coil body 25 of the coil unit 21 adjacent to the free face end 15. A cylindrical yoke sleeve 61, concentric the rotation axis 9, made from concentrator material which protrudes from the concentrator elements 55 axially to the other coil unit connects to the concentrator elements 55 preferably, adjacent to them on the radial outer side of the coil unit 21. The coil unit 21 and the yoke sleeve 61 are supported rotatable at the guide ring 37, rotatable concentric with the rotation axis 9, however axially fixated. The yoke sleeve 61 including the coil unit 21, connected therewith are axially moveable, additionally however guided torque proof at the guide ring 39. For this purpose one or several axial slots 63 are provided at the yoke sleeve 61, into which a respective protrusion 65, connected with the guide ring 39 engages for torque proofing. It is appreciated that a slot, which can also be provided as a groove, can be alternately also provided in the guide ring 39.

A control cam 69 is mounted at the guide ring 37 e.g. through bolts 67 or a disengage able coupling, wherein said control cam covers and axially fixates the concentrator elements 55 on the side facing away from the coil unit 21 in axial direction. The control cam has, as shown in FIGS. 2b and 3b, a pass through opening 71, concentric with the rotation axis 9 for the sleeve section 3 and it is coupled with each of the concentrator elements 55 through slanted surface cam assemblies 73. When the control cam 69 is rotated relative to the guide ring 39, the slanted surface cam assemblies 73 pivot the concentrator elements 55 around the axis pin 59 and thus change the radial overhang of the concentrator elements 55 beyond the inner circumference of the cam unit 21 in a radial direction relative to the rotation 9. The slanted surface cam assemblies 73 are formed by approximately spiral shaped grooves or slots 75 in the control cam 69 and by cam protrusions 77 at the concentrator elements 55.

Figure 2B:
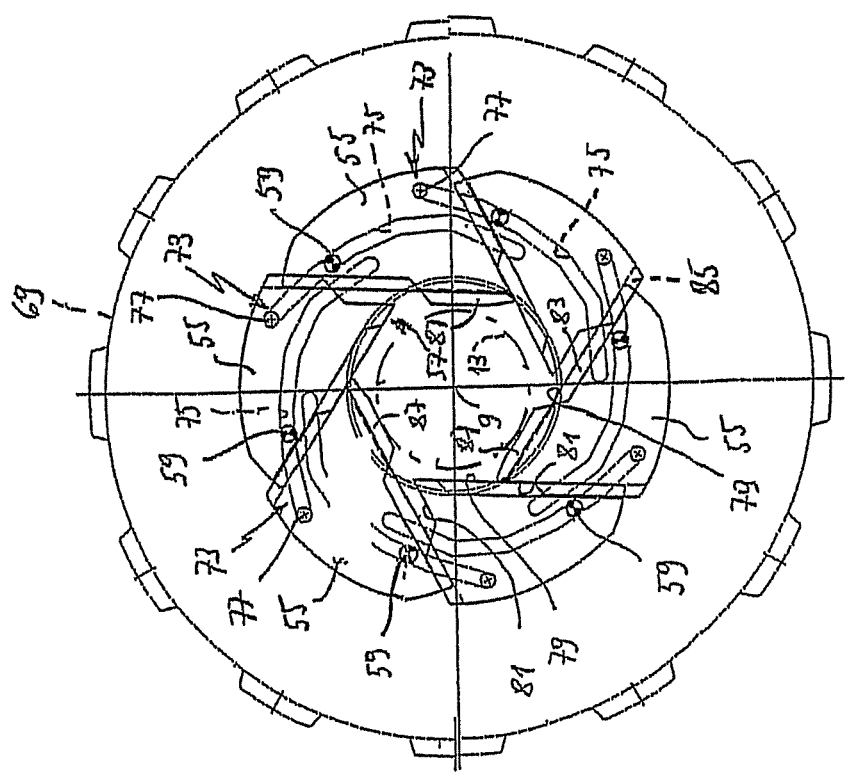

As can be seen best in FIGS. 2a, 3a, each of the concentrator elements 55 has a first rim 79, through which it is located opposite to the rotation axis 9, and a second rim 81, which follows at an acute angle to the end of the first rim 79, adjacent to the rotation axis 9. The rims 79, 81 have cut outs 83 or 85 extending along the rims, on which adjacent concentrator elements 55 overlap in circumferential direction in an interlocking manner with their first rim 79 and their second rim 81. The concentrator elements 55 thus form a pass through opening 57 in circumferential direction, whose size can be changed by rotating the control cam 67 between a maximum open diameter (FIG. 2a) and a minimum opening diameter (FIG. 3a).

Figure 2D:
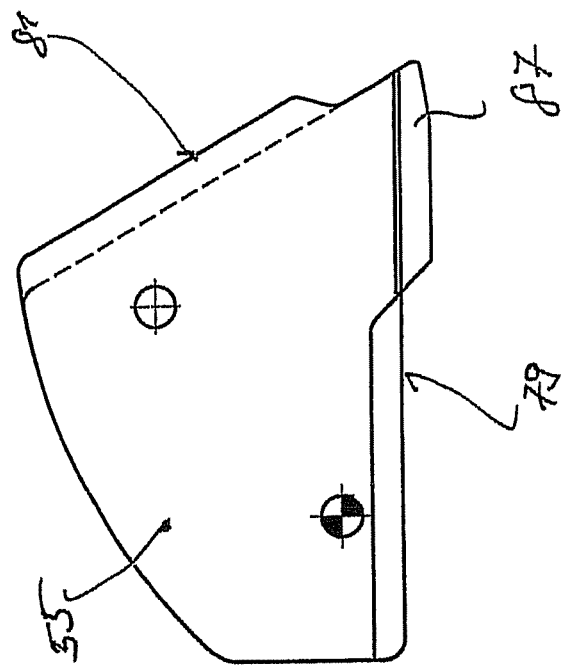
FIG. 2d a top view of a concentrator element of the other group.
Figure 2C:
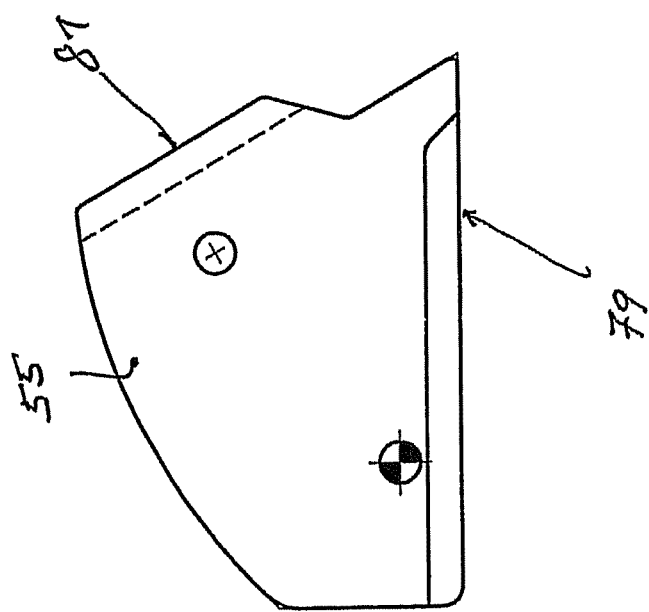
FIG. 2c a top view of a group of concentrator elements.

The first rim 79 of concentrator elements 55 adjacent in circumferential direction is designed differently, and thus so that in a first group of concentrator elements 55 the radial overhang of the portion defining the pass through opening 57 of the first rim 79 over the inner circumference of the coil unit 21, is larger than the radial overhang of the respective section of a second group of concentrator elements 55. The concentrator elements 55 of the two groups alternate in circumferential direction. As shown in the FIGS. 2a and 2b the radially raised portions 87 of the concentrator elements 55 define the pass through opening 57 on a smaller diameter circle, than the concentrator elements 55 of the second group. As shown in FIG. 3a, the minimum diameter of the pass through opening 57 can be kept small this way, since the concentrator elements 55 of the second group radially recede in comparison. The two groups of concentrator elements 55 furthermore become evident from FIGS. 2c and 2d showing a top view, wherein the radial overhang or radially raised section 87 becomes evident in particular from 2d. In alternative embodiment the concentrator elements 55 can also be provided identical amongst each other, wherein such an embodiment is documented in 2e in top view.

The raised sections 87 can be comprised of the soft magnetic material of the concentrator elements 55, but they are preferably made from a thermally insulated material, like e.g. plastic or ceramic, in order to insulate the concentrator assembly 53 thermally from the sleeve section 3 which is heats up during operation. The raised sections 87 form stop surfaces 89 at their side axially facing the coil unit 21, through which the unit 1 can be axially positioned at the free face end 15, and thus so that the concentrator elements 55 are closely adjacent to the circumference and/or the front face in the section of the free end. The concentrator elements can thus overlap the circumferential surface and/or the front face in an axial or radial manner. However, this is not necessary.

The concentrator assembly 35 associated with the coil unit 23 also comprises a yoke sleeve 91, enclosing the coil unit 23 on the radial outside, concentric with the rotation axis 9, and engaging into the yoke sleeve 61 of the concentrator assembly 35 axially in a telescoping manner. A radially inward protruding annular flange 93 integrally connects to the yoke sleeve 61 on the side of the coil unit 23, axially facing away from the coil unit 21. The yoke sleeve 91 and the annular 93 are comprised of concentrator material. The coil unit 23 and also the concentrator assembly 35 are connected to the guide ring 39 in a rigid manner. The yoke sleeves 61, 91 are thus substantially closed in circumferential direction. It is understood that instead of annular closed sleeves also finger shaped yoke structures are suitable, whose axially extending fingers following each other in circumferential direction, lock into each other in an alternating manner.

Since the control cam 69 is connected torque proof with the guide ring 37, through rotating the control cam 69 at the grip ribs provided at its outer circumference for this purpose relative to the torque proof guide ring 39 in a single operating process the axial distance of the coil unit 21, 23, and also the diameter of the pass through opening 57 can be adapted to the tool holder 5 to be heated. Operating the unit 1 is thus simplified. However, the control disc 39 can also be decoupled from the guide ring 37, when necessary, in which a respective coupling between both elements is provided. For example also engagement pins can be used instead of the bolt 67, wherein said engagement pins connect the control cam 69 with the guide ring 37 in laid in position. In case of laid out engagement pins the control cam 69 is now decoupled from the guide ring 37, so that only the concentrator assemblies can be adjusted by rotating the control cam.

The coil units 21, 23 are connected in series, preferably however connected in parallel to each other to the AC generator 19, and thus so that they generate a unidirectional flux in the sleeve section 3. The AC generator comprises a control system controlling the strength of the current and/or the frequency and/or the voltage attached to the coil units 21, 23 and/or the power on duration of the current according to a predetermined program, depending on the size of the tool holder 5 to be set at the AC generator 19. Since the unit 1 has to be adjusted to the size of the tool holder 5, rotating the control disc 69 in a preferred embodiment at least one position sensor 97 is provided detecting the relative position of the two guide rings 37, 39 in rotating position, and/or in axial direction, pre adjusting the control of the AC generator 19 to the size of the tool holder 5 to be heated accordingly. The handling is simplified and automated even more this way. It is understood, that position sensor 97 can also respond to the relative positions of the components of the unit 1 moving relative to each other, e.g. to the relative position of the concentrator elements 55, relative to a stationary part, e.g. the control disc 69.

In order to avoid overheating the sleeve section 3, a temperature sensor 99 is disposed axially between the coil units 21, 23, e.g. at one of the guide rings 37 or 39, detecting the temperature at the outer of the sleeve section 3. The temperature sensor 99 can thus be designed so that it contacts the circumferential surface of the sleeve section 3 in a resilient manner, when necessary, or so that it detects the temperature without contact. The temperature sensor 99 can turn off the power supply through the control system of the generator 19, depending on a predetermined threshold value and additionally and/or alternatively trigger an acoustic warning signal. Also the actual value of the temperature can be displayed on a display.

Subsequently variants of the previously described induction coil unit are described. Components with identical functions are designated with the designations of the FIGS. 1 through 4, and provided with a letter for differentiation. In order to describe the whole layout and the operating principle and for describing potential variants, the entire description is referred to respectively.

Figure 5:
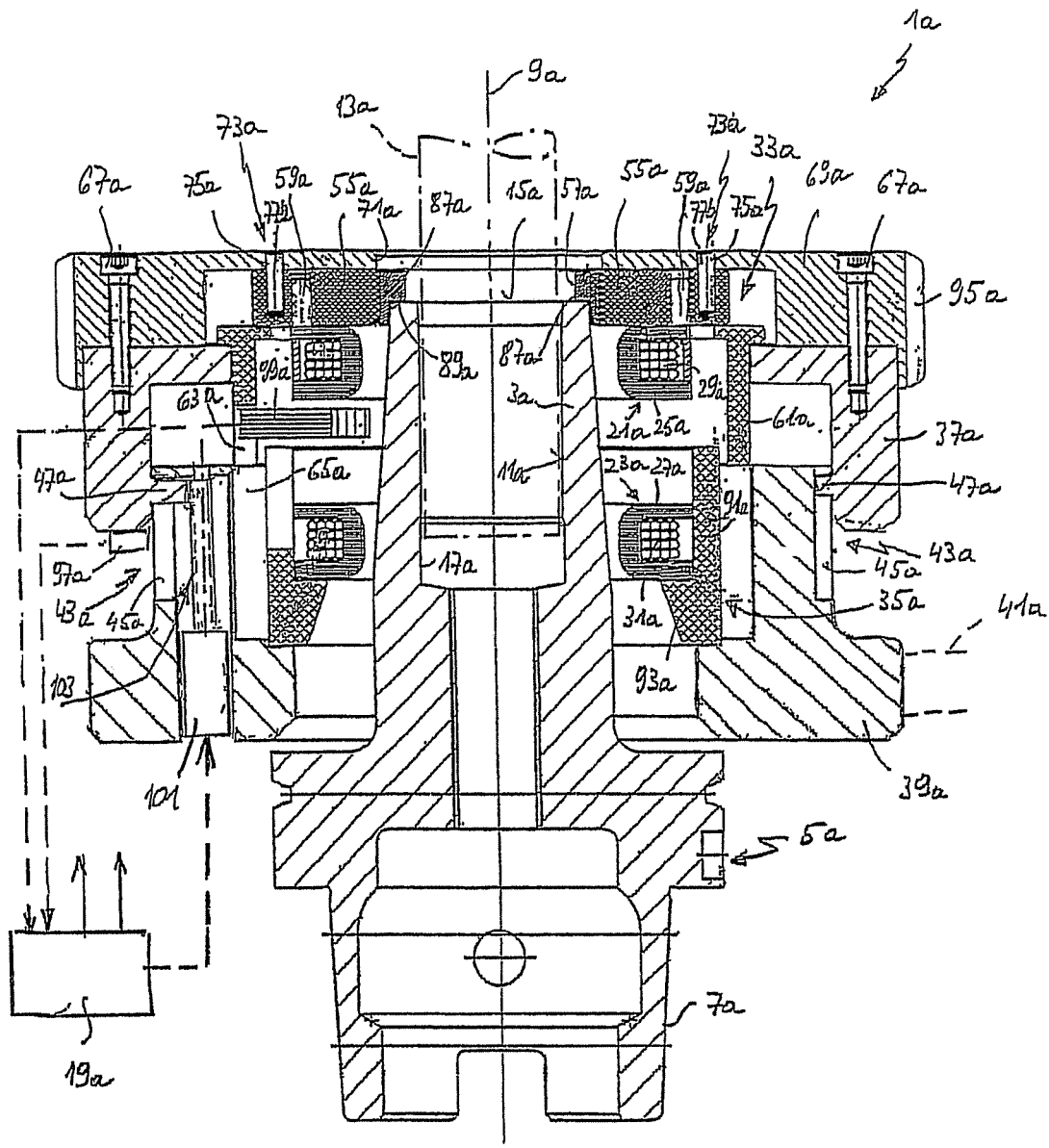
FIG. 5 an axial longitudinal sectional view of an embodiment of the induction coil unit.

FIG. 5 shows an induction coil unit 1a, which substantially only differs from the unit 1 described with reference to the FIGS. 1-4 through a servo motor 101 being connected to one of the guide rings 37a or 39a, in this case the guide ring 39a, driving the other guide ring through a gear box 103, in this case the guide ring 37a around the rotating axis 9a in a rotating manner. The servo motor 101 is a component of a positioning drive detecting the actual position of both guide rings 37a, 39a, relative to each other through the position sensor 97a. The size of the tool holder 5a to be heated is adjustable at the AC generator 19a, and the AC generator 19a controls the drive motor 101 into the position associated with the tool holder 5a accordingly. The servo motor 101 can be a stepper motor, so that the number of drive impulses supplied to the stepper motor constitutes a measure for the relative rotation angle of the two guide rings 37a, 39a. The position sensor 97a can be dispensed with in this case, but it can be replaced through end switches, detecting the end positions. The gear box 103 can be provided conventional. In the present case a sprocket is located on the shaft of the motor 101, which meshes with the gear of the guide sleeve 37a.

Figure 6:
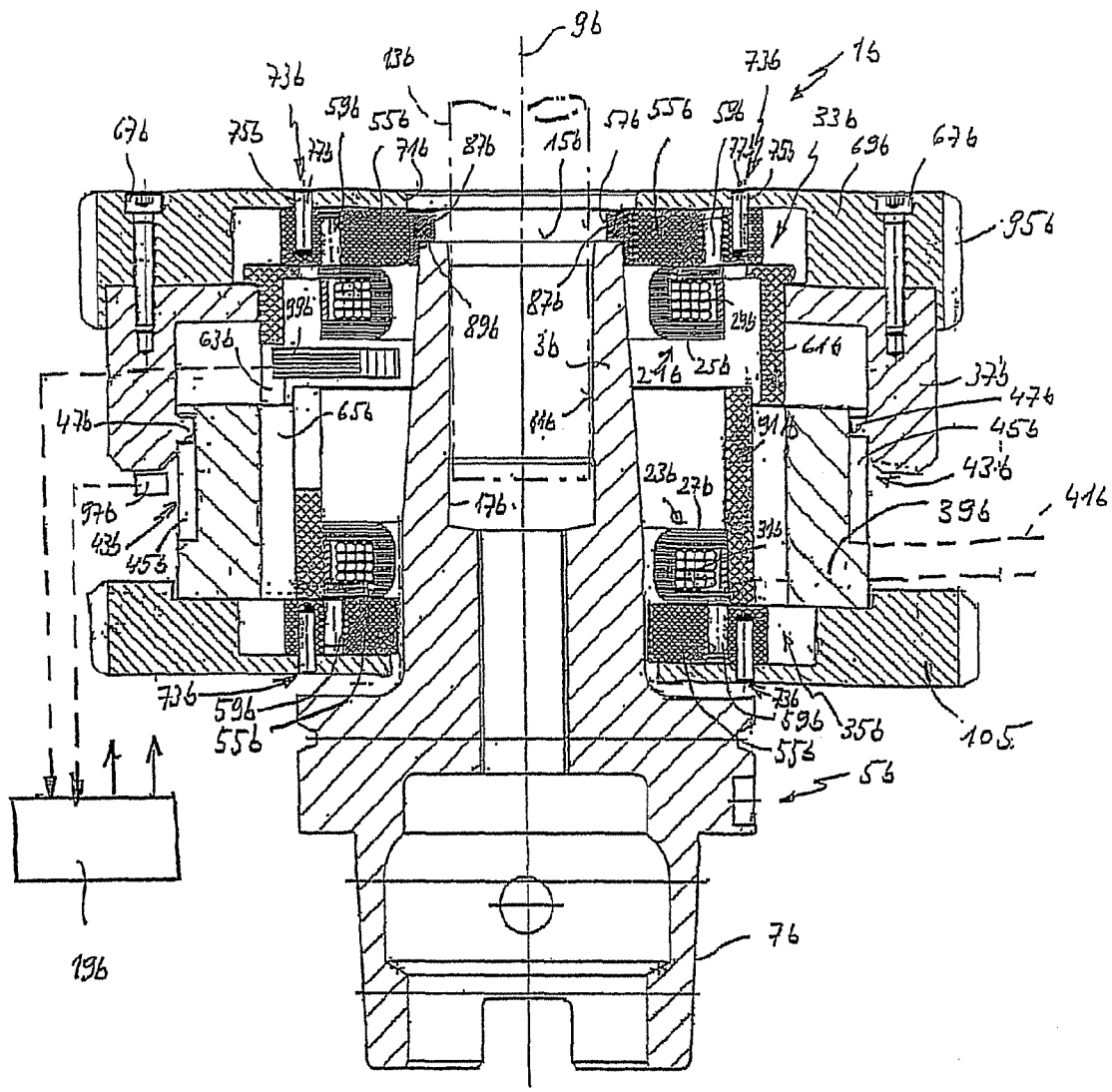
FIG. 6 an axial longitudinal sectional view of another embodiment of the unit.

FIG. 6 shows an induction coil unit 1b, which differs from the induction coil unit 1 of the FIGS. 1-4 substantially only through the concentrator unit 35b of the coil unit 23b, facing away from the free face end 15b in an axial manner according to the concentrator assembly 33b of the coil unit 21b and comprising an additional set of concentrator elements 55b, instead of the annular flange 93 connected with the yoke sleeve 91 which are pivotally guided through axle pins 59b with their rotation axes parallel to the rotation axis 9b, pivot able guided at the coil body 27b, or the yoke sleeve 91b, or the guide ring 39b. Another control cam 105 is rotatably supported at the guide ring 39b, but axially fixated, which is coupled with the additional concentrator elements 55b through the slanted surface cam assemblies 73b. The concentrator elements 55b and the slanted surface cam assemblies 73b are formed according to the components 55 and 73 of the FIGS. 1-4. Through the control element 105 the concentrator elements 55b of the concentrator assembly (35b) can be approximated independently of the concentrator elements of the concentrator assembly 33b to the outer circumference of the tool holder, preferably however attached. These preferably thermally insulating raised sections (87b) can be dispensed with at the concentrator elements 55b of the concentrator assembly 35 b, or they can be available at the all concentrator elements 55b.

During operation the concentrator assembly 33b is initially adjusted to the diameter of the sleeve section 33b through adjustment of the control cam 69b, whereby also the axial distance of the coil units 21b and 23b is adjusted. After placing the unit 1b onto the tool holder 5b also the concentrator elements 55b of the concentrator assembly 35b are moved close to the tool holder 5b through rotating the control cam 105.

A variant in which the guide rings 37b and 39b are adjusted through a servo motor according to the method illustrated in FIG. 5, before the control cam 105 is then adjusted manually, is not shown in more detail. The control cam 105 can be driven by another servo motor if necessary.

What is claimed is:

1. An induction coil unit for heating a sleeve section of a tool holder including a free end and a receiver opening for a shaft of a rotating tool, wherein said tool holder holds the shaft of the rotating tool that is coaxially disposed with respect to a rotational axis of the induction coil unit, resting in the receiver opening, in a press fit and releases the shaft of the rotating tool, when heated, the induction coil unit comprising:

- a coil assembly inducing Eddy currents on and enclosing the sleeve section during a heating operation, the coil assembly further including a first coaxial coil unit and a second coaxial coil unit surrounding the sleeve section which are disposed at an operatively changeable axial distance from each other, the first coaxial coil unit adjacent to the free end of the sleeve section;
- a first magnetic flux concentrator assembly connected to the first coaxial coil unit in an axially fixated manner, the first magnetic flux concentrator assembly made from magnetically soft material, which is electrically substantially non-conductive, the first concentrator assembly being disposed axially and radially outside of the first coaxial coil unit adjacent to the free end of the sleeve section, which can be disposed at least close to the free end of the sleeve section of the tool holder;
- a second magnetic flux concentrator assembly connected to the second coaxial coil unit in an axially fixated manner, the second magnetic flux concentrator assembly made from magnetically soft electrically substantially non-conductive material being provided axially and radially outside of the second coaxial coil unit remote from the free end of the sleeve section, wherein at least one of the first magnetic flux concentrator assembly and the second magnetic flux concentrator assembly comprises a portion protruding axially relative to the other one of the first and second magnetic flux concentrator assemblies, so that the first and second magnetic flux concentrator assemblies shield a magnetic field of the coil assembly to the outside extensively; and
- an adjustment assembly positioned radially outside of the first and second magnetic flux concentrator assemblies and including at least one helix-shaped control surface and at least one cam protrusion for adjustment of the axial distance of the first and second coaxial coil units relative to each other and the axial distance of the first and second magnetic flux concentrator assemblies relative to each other.

2. The induction coil unit according to claim 1, wherein stop means operating together with the tool holder are provided, determining an axial position of the induction coil unit at the free end of the sleeve section and thus also determining axial positions of first and second coaxial coil units and of the first and second magnetic flux concentrator assemblies, relative to the free end of the sleeve section during the heating operation.

3. The induction coil unit according to claim 2, wherein the first coaxial coil unit and the first magnetic flux concentrator assembly have a fixed axial position relative to the stop means, and that through the adjustment assembly, the axial position of the second coaxial coil unit and of the second magnetic flux concentrator assembly can be selectively adjusted relative to the stop means.

4. The induction coil unit according to claim 2, wherein the second coaxial coil unit and the second magnetic flux concentrator assembly are selectively adjustable through the adjustment assembly to predetermined axial positions relative to the stop means.

5. The induction coil unit according to claim 1, wherein the at least one helix-shaped control surface of the adjustment assembly includes at least two indexing sections connected by at least one slanted surface section.

6. The induction coil unit according to claim 5, wherein the at least one helix-shaped control surface comprises control surface sections, extending in orthogonal planes relative to the rotation axis, in predetermined axial positions of the first and second coaxial coil units or the first and second magnetic flux concentrator assemblies, thereby locking the coil units or the concentrator assemblies in the axial direction.

7. The induction coil unit according to claim 1, wherein the axial position of the first and second coaxial coil units and the axial position of the first and second magnetic flux concentrator assemblies can be changed relative to each other through a servo motor.

8. The induction coil unit according to claim 1, wherein the axially protruding portion of the at least one of the first and second magnetic flux concentrator assemblies is positioned radially outside of a corresponding one of the first and second coaxial coil units, wherein said portion overlaps with the other one of the first and second magnetic flux concentrator assemblies.

9. The induction coil unit according to claim 8, wherein both magnetic flux concentrator assemblies have portions protruding towards each other and said portions overlap axially.

10. The induction coil unit according to claim 9, wherein the portion of the first magnetic flux concentrator assembly is provided as a first yoke sleeve and the portion of the second magnetic flux concentrator assembly is provided as a second yoke sleeve, the first yoke sleeve and the second yoke sleeve locking into each other coaxially.

11. The induction coil unit according to claim 1, wherein the first magnetic flux concentrator assembly and the second magnetic flux concentrator assembly have several concentrator elements made from magnetically soft, electrically substantially non-conductive material, disposed in a circumferential direction around a rotation axis of the rotating tool, wherein at least a portion of each of the concentrator elements of the first magnetic flux concentrator assembly protrudes radially beyond an inner circumference of the first coaxial coil unit, wherein at least a portion of each of the concentrator elements of the second magnetic flux concentrator assembly protrudes radially beyond an inner circumference of the second coaxial coil unit, and wherein an amount of the protrusion of the concentrator elements beyond the inner circumference of the respective first and second coaxial coil units towards the rotation axis can be changed.

12. The induction coil unit according to claim 11, wherein the concentrator elements can be pivoted relative to each of the first and second coaxial coil units around a pivot axis extending in parallel to the rotation axis.

13. The induction coil unit according to claim 12, wherein the concentrator elements have disc shapes opposing the rotation axis with a first rim, thereby forming a pass through opening for the shaft of the rotating tool and for the sleeve section of the tool holder, and the concentrator elements each have a second rim, extending at a slanted angle relative to the first rim.

14. The induction coil unit according to claim 13, wherein the first rim and the second rim of adjacent concentrator elements overlap at least on part of their length in a circumferential direction, and in an interlocking manner, and the first magnetic flux concentrator assembly further comprises a first group of concentrator elements with a first shape and a second group of concentrator elements with a second shape, alternating in circumferential direction, so that a radial overhang of the concentrator elements of the first group beyond the inner circumference of the first coaxial coil unit at an identical angular position is larger than a radial overhang of the concentrator elements of the second group.

15. The induction coil unit according to claim 14, wherein the concentrator elements of the first group carry stop elements forming a stop means at their first rim for axial positioning of the first magnetic flux concentrator assembly and the first coaxial coil unit connected therewith, relative to the tool holder.

16. The induction coil unit according to claim 11, wherein concentrator elements are adjustable through a common control element, rotatable around the rotation axis of the tool holder, coupled with the concentrator elements through control surface cam follower assemblies.

17. The induction coil unit according to claim 16, wherein the first and second coaxial coil units resist rotation with respect to said axis of the tool holder, but are axially moveable relative to each other, and the control element adjusting the concentrator elements of the first coaxial coil unit is connected in a manner to resist rotation with the second coaxial coil unit.

18. The induction coil unit according to claim 16, wherein the control element comprises a manually operable handling element.

19. The induction coil unit according to claim 16, wherein the control element can be driven through a servo motor.

20. The induction coil unit according to claim 1, wherein at least one position sensor is associated with the first and second coaxial coil units and the first and second magnetic flux concentrator assemblies generating a signal representing an axial distance of the first and second coaxial coil units and of the first and second magnetic flux concentrator assemblies and a radial overhang of at least the first magnetic flux concentrator assembly beyond an inner circumference of the first coaxial coil unit, and the first and second coaxial coil units are connected to an AC generator, whose current, power on duration, and voltage are controllable depending on the signal.

21. The induction coil unit according to claim 1, wherein an axial distance of the first and second coaxial coil units and of the first and second magnetic flux concentrator assemblies, and a radial overhang of at least the first magnetic flux concentrator assembly is controllable through at least one positioning drive and that the first and second coaxial coil units are connected to an AC generator, whose current, power on duration, and voltage is adjustable, and which controls the at least one positioning drive.

22. The induction coil unit according to claim 1, wherein a temperature sensor is disposed axially between the first and second coaxial coil units, for detecting a temperature of the sleeve section of the tool holder.

23. The induction coil unit according to claim 1, wherein:
said adjustment assembly includes at least one of a guide ring or guide rail.

24. The induction coil unit according to claim 1, wherein the first coaxial coil unit and the first magnetic flux concentrator assembly have a fixed axial position with respect to the free end of the tool holder, and wherein the axial position of the second coaxial coil unit and the second magnetic flux concentrator assembly is adjustable relative to the fixed axial position of the first coaxial coil unit and the first magnetic flux concentrator assembly.

* * * * *